(12) United States Patent
Stewart et al.

(10) Patent No.: US 7,734,927 B2
(45) Date of Patent: Jun. 8, 2010

(54) REAL-TIME VOTING BASED AUTHORIZATION IN AN AUTONOMIC WORKFLOW PROCESS USING AN ELECTRONIC MESSAGING SYSTEM

(75) Inventors: Eben P. Stewart, Hamden, CT (US); Michael Van Der Meulen, Woodbridge, CT (US)

(73) Assignee: International Business Machines Corporation, Armonk, NY (US)

( * ) Notice: Subject to any disclaimer, the term of this patent is extended or adjusted under 35 U.S.C. 154(b) by 1691 days.

(21) Appl. No.: 10/895,655

(22) Filed: Jul. 21, 2004

(65) Prior Publication Data

US 2006/0021023 A1 Jan. 26, 2006

(51) Int. Cl.
*G06F 9/00* (2006.01)
(52) U.S. Cl. ............... 713/182; 713/185; 713/150; 713/168
(58) Field of Classification Search .......... 713/182, 713/185, 150, 168
See application file for complete search history.

(56) References Cited

U.S. PATENT DOCUMENTS

| 5,806,079 A | 9/1998 | Rivette et al. ........... 707/512 |
| 2002/0038430 A1 | 3/2002 | Edwards et al. ......... 713/200 |
| 2002/0049782 A1 | 4/2002 | Herzenberg et al. ..... 707/500.1 |

FOREIGN PATENT DOCUMENTS

| JP | 2002123653 A | 4/2003 |
| WO | WO0144980 A2 | 6/2001 |
| WO | WO03030016 A2 | 4/2003 |

OTHER PUBLICATIONS

"Designing a Distributed Access Control Processor for Network Services on the Web", R. Kraft, ACM Workshop on XML Security, Nov. 2002, pp. 36-52.
"Extracting Usability Information from User Interface Events", D. Hilbert et al., ACM Computing Surveys, vol. 32, No. 4, Dec. 2000, pp. 384-410.
"SecureFlow: A Secure Web-enabled Workflow Management System", W. Huang et RBAC '99, Oct. 1999, pp. 83-94.
"Security Protocol for IEEE 802.11 Wireless Local Area Network", S. Park et al, Baltzer Science Publishers, VB, pp. 237-246.
"Spoken Dialogue Technology: Enabling the Conversational User Interface", M. McTear, ACM Computing Surveys, Vo. 34, No. 1, Mar. 2002, pp. 90-104.

*Primary Examiner*—Thomas R Peeso
(74) *Attorney, Agent, or Firm*—John E. Campbell; Floyd A. Gonzalez (57) ABSTRACT

In a network of computer systems having a group of users subscribing to a service comprising restricted channels, a user applies for an action to be performed by an automated software agent. The agent initiates a poll of a predetermined group of subscribers soliciting votes for approving the action. When the poll is complete, the votes are tallied by the agent and compared with predetermined authorization rules. If the votes pass the rules test, the action is approved and performed by a software agent. The user in one embodiment is an automated software agent.

11 Claims, 6 Drawing Sheets

REAL-TIME VOTING BASED AUTHORIZATION IN AN AUTONOMIC WORKFLOW PROCESS USING AN ELECTRONIC MESSAGING SYSTEM

FIELD OF THE INVENTION

The present invention is related to systems and methods for electronic communication, more particularly to systems and methods for receiving permission to edit attributes of a communications structure automatically by consensus of distributed users.

BACKGROUND OF THE INVENTION

Figure 1:
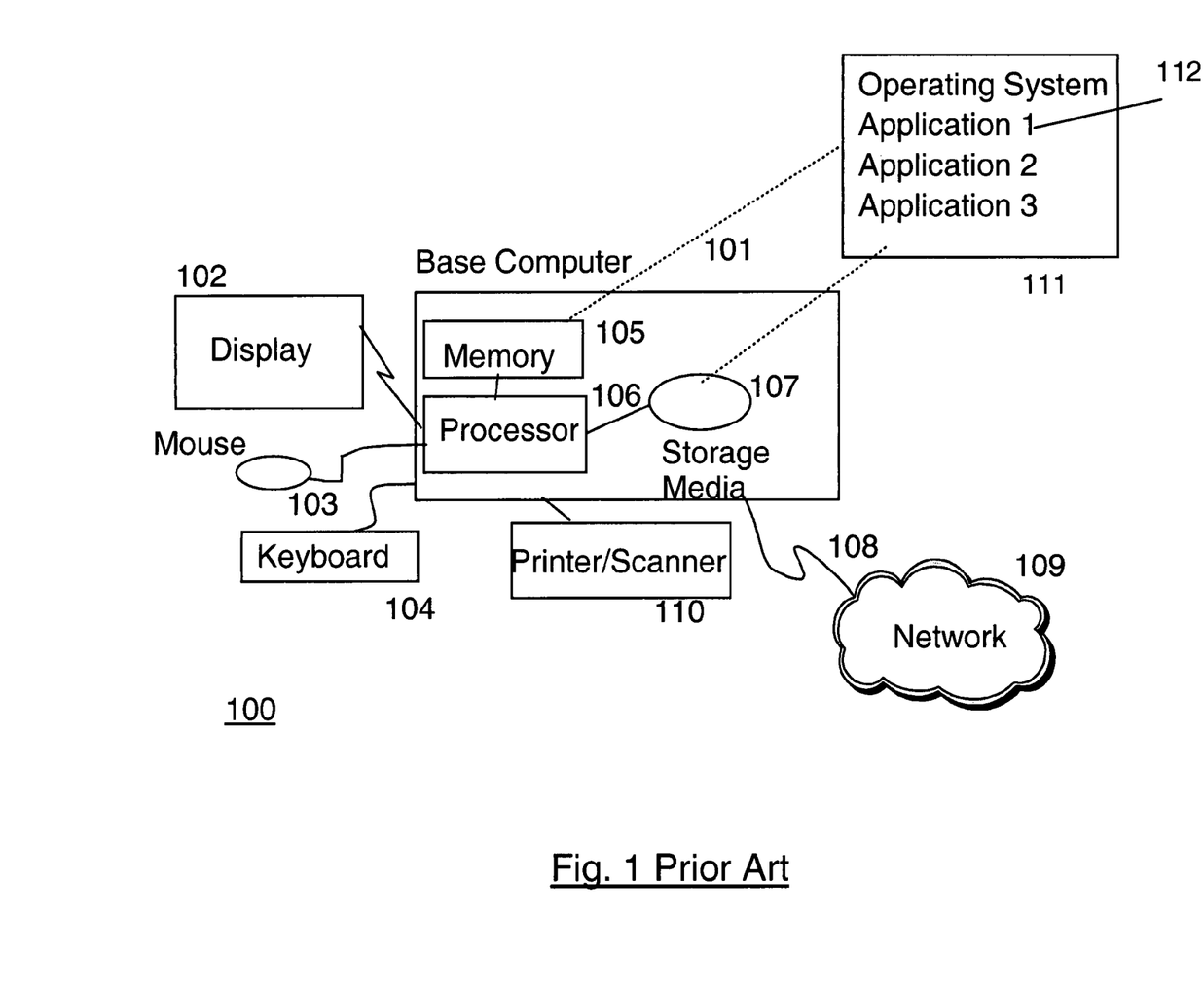
FIG. 1 is a diagram depicting example components of a computer system.

FIG. 1 depicts the elements that make up a typical computer for use in presenting and maintaining an application. The computer 100 consists of a Base Computer 101 which comprises a processor 106, storage media such as a magnetic disk 107 and a high speed volatile main memory 105. An operating system and application programs 111 reside on the storage media 107 and are paged into main memory 105 as needed for computations performed by the processor 106. The Base computer may include optional peripheral devices including a video display 102, a printer or scanner 110, a keyboard 104, a pointing device (mouse) 103 and a connection 108 to a network 109. In a client environment, a user will interact with a (Graphical User Interface) GUI by use of a keyboard 104 and mouse 103 in conjunction with the display of information on the display 102 under control of an application program (application 1) 112. The client application program 112 will then interact with remote users by way of the network 109.

Figure 2:
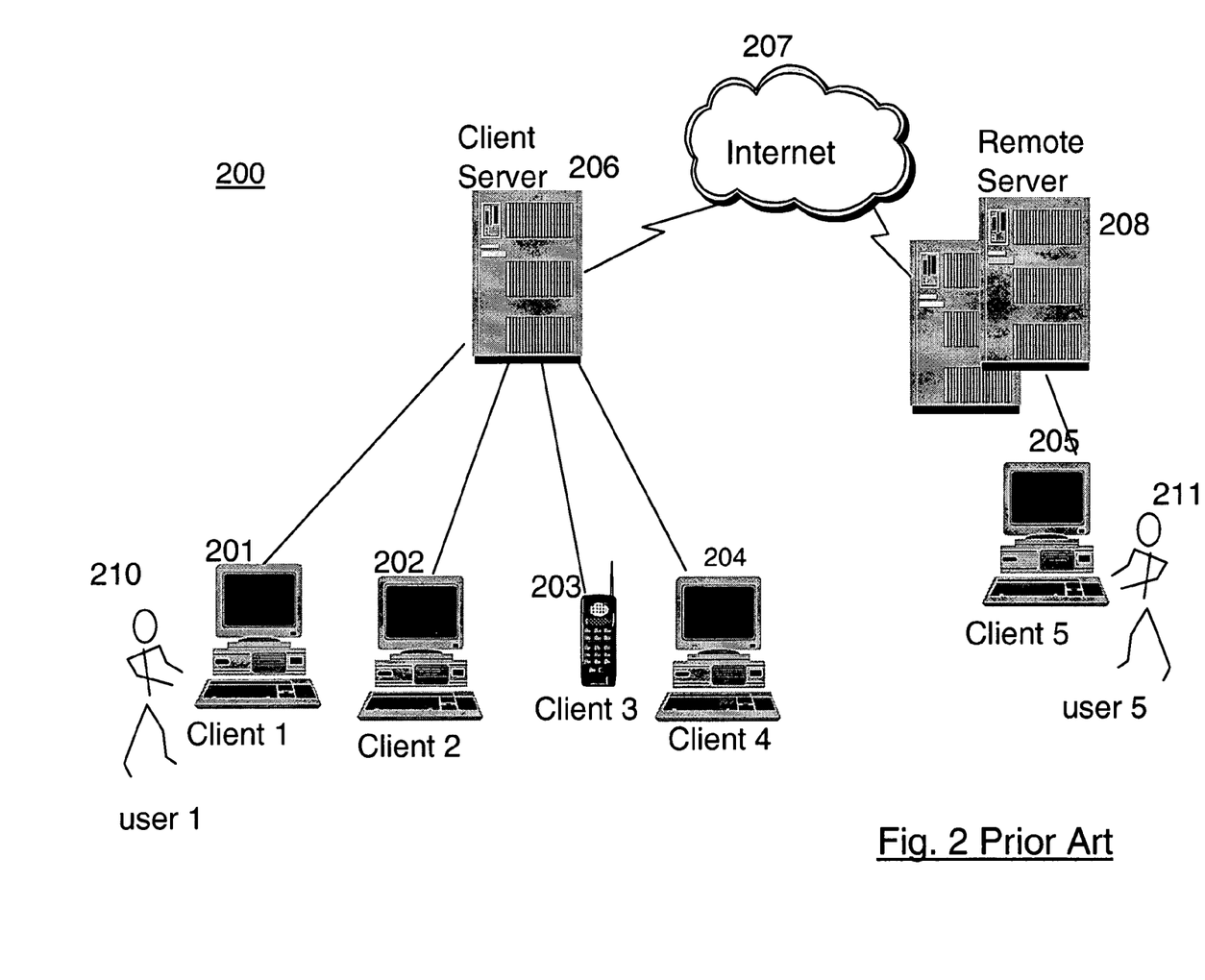
FIG. 2 is a diagram depicting example components of a client-server network.

In FIG. 2 an example Internet system is shown. A user at client 1 201 uses applications on his system. This user (user 1 210) at client 1 201 can interact with clients 2-4 202-204 by way of a client server computer 206. Applications 112 may be provided by each client 201-205 and or the client server 206 or some remote server 208 by way of the network 207. The user at client 1 201 can interact with a remote user (user 5 211) at client 5 205 by way of the Internet 207.

Figure 3:
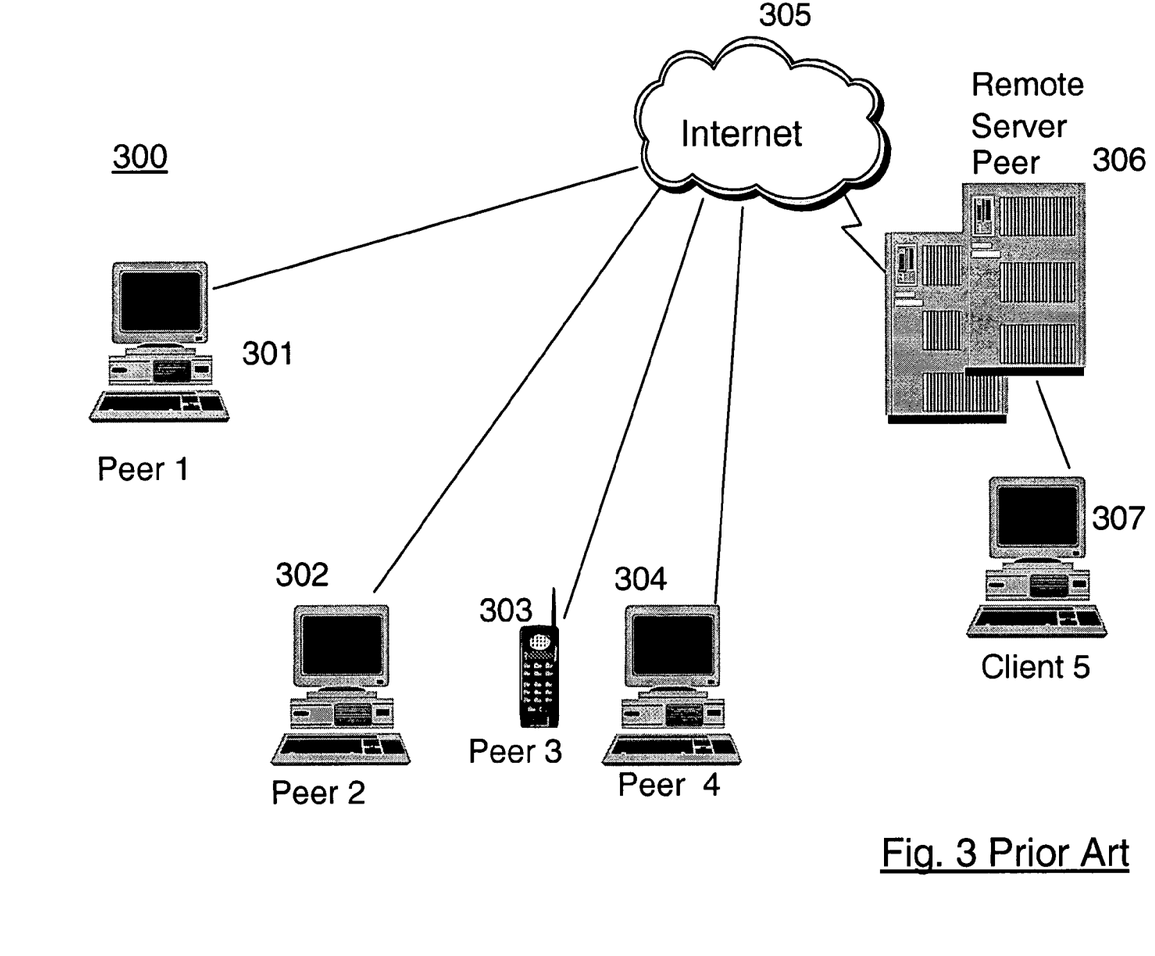
FIG. 3 is a diagram depicting an example peer-to-peer network.

Recently, peer to peer (P2P) interconnection has become an interesting alternative. FIG. 3 shows an example P2P network 300 wherein Peer 1 301 can communicate with other peers directly. Each peer essentially includes client and server function. Thus, Peer 1 301 acts as a client in sending messages to Peer 2 302. Peer 2 performs some function as a result of receiving the message and may return a message to peer 1. Thus, peer 2 302 acts as a server for peer 1 301. P2P grids provide networked computers that cooperate to perform distributed computing.

Within any computing environment, authorization requests are often made for actions that could be easily determined by a group vote or poll. These requests are normally made to a 'known' authorization authority, usually a 'real' person. These requests are usually made in some defined workflow process, and are not 'real-time'. Real-time is defined as any process which has an immediate request, processing and response workflow.

U.S. patent application Ser. No. 10/207,685 "INTERACTIVE ONE TO MANY COMMUNICATION IN A COOPERATING COMMUNITY OF USERS" Filed Jul. 26, 2002 assigned to IBM and incorporated herein by reference; provide a GUI interface at a user's terminal for interacting with a Pub/Sub service. In one embodiment, a user is permitted to publish instant messages to subscribers subscribing to a channel of the pub/Sub service. A channel is essentially a topic of interest to a sub group of subscribers. A channel might be set up for "Owners of MGB motor cars" for example while another channel might be set up for "Type 1 Diabetes medications". In the prior art, each channel must be created manually. There has to be a need recognized for the new channel as well as other criteria including security, ownership and maintenance in order for a channel to be added or deleted. Once it is added it is available to be displayed at the user's GUI. Such a process is time consuming and relatively unstructured.

In certain situations, providing permission is a dynamic situation. For instance, an electronic group meeting might be convened (Chat room for instance) that requires different membership based on activity. The user not authorized to join the group might be invited the group but how might the group provide a temporary authorization since the not authorized user may be acceptable to some members but not to others. A method is needed to handle such cases.

For another example, creation of an electronic news forum is often discussed in a central discussion location, and if all (or a portion thereof) of the people involved agree on the name, then the information is passed to a third party for creation of the forum, the third party is a 'real' person with the authority to do so.

There is a need to automate and hasten this process to allow a group to come to a consensus on the name of the forum and provide the authorization prerequisites to an automated service capable of servicing the request. This service would have the security rights necessary to perform the specified request. There is an additional need to process these requests faster than is currently possible with email, web-based, or other asynchronous processes.

SUMMARY OF THE INVENTION

The invention teaches a method for providing real-time peer or group-based authorization methods for workflow management in a computing environment using publish-subscribe messaging technology. The authorization method enables a set of peers or a predefined group to authenticate a request for an action, the authentication based on a predefined voting or polling method having a predefined voting criteria (rule set). This vote may be based on any of a number of rule sets (e.g. majority or any predefined percentage required to authenticate, as well as a minimum required participation level). The request is then processed without the intervention of a third party user (normally required for such authorization requests). This invention enables more streamlined workflow processes, allowing minimal human interaction for these authorization requests, and the publish-subscribe technology enables this process to happen in real-time.

With the present invention it is possible for an authorization request to be generated on an automated system that generates a poll for a vote that the group can take action on, in real time, via a publish/subscribe system. This process can either be anonymous, or non-anonymous, based on the type of poll (rule set) requested. Based on a set of rules, this action is then authorized, and the forum is created, for example. An example of a rule might be: (At least 10,000 subscribers are online, 60% of the subscribers response required, with simple majority success). These rules define the participation level and number of votes needed, as well as any other required parameters. In another embodiment, weighted voting is accomplished by assigning different weights to certain voting members' votes (poll moderators, administrators, etc.) or a veto power to other users. Additional security is accomplished through various means of user authentication and verification of the voting process itself using techniques known in the art.

The publish-subscribe (pub/sub) system also allows for an anonymous group definition (i.e. the actual users subscribed to the system and responding to the particular poll or vote are not necessarily known ahead of time, but rather takes advantage of open subscription policies). A user authentication a process is preferably used to ensure a single vote per user, but is not required by the invention.

The present invention provides a method for authorization that involves polling a community and granting authorization based on voting responses by the community.

It is therefore an object of the invention to provide a Real-time group query and response to manage membership in a network community.

It is another object of the invention to generate and publish Poll/vote requests in real-time using a publish-subscribe system and tabulating responses in real-time, and taking immediate appropriate action.

It is a further object of the invention to provide a complete end-to-end solution, from the poll/vote generation to collection and processing of responses, and taking appropriate action at the end of the poll time period.

It is further an object of the invention to define rule sets for feedback and result criteria and the action that needs to be taken when a poll is complete.

Yet another object of the invention is to fully automate the authorization and final action. No third party intervention is necessary. The rule sets combined with the end-to-end capabilities define and allow automated actions to take place when the poll/vote is complete.

The above as well as additional objectives, features, and advantages of the present invention will become apparent in the following written description.

The detailed description explains the preferred embodiments of the invention, together with advantages and features, by way of example with reference to the drawings.

DESCRIPTION OF THE PREFERRED EMBODIMENTS

The present invention provides a method for reducing the amount of human interaction in trivial or non-critical authorization situations. Further the invention reduces the overhead costs of maintaining user or community systems that have the ability to be self-maintaining. The real-time nature speeds up certain business processes and take advantage of new publish-subscribe messaging technology.

Figure 4:
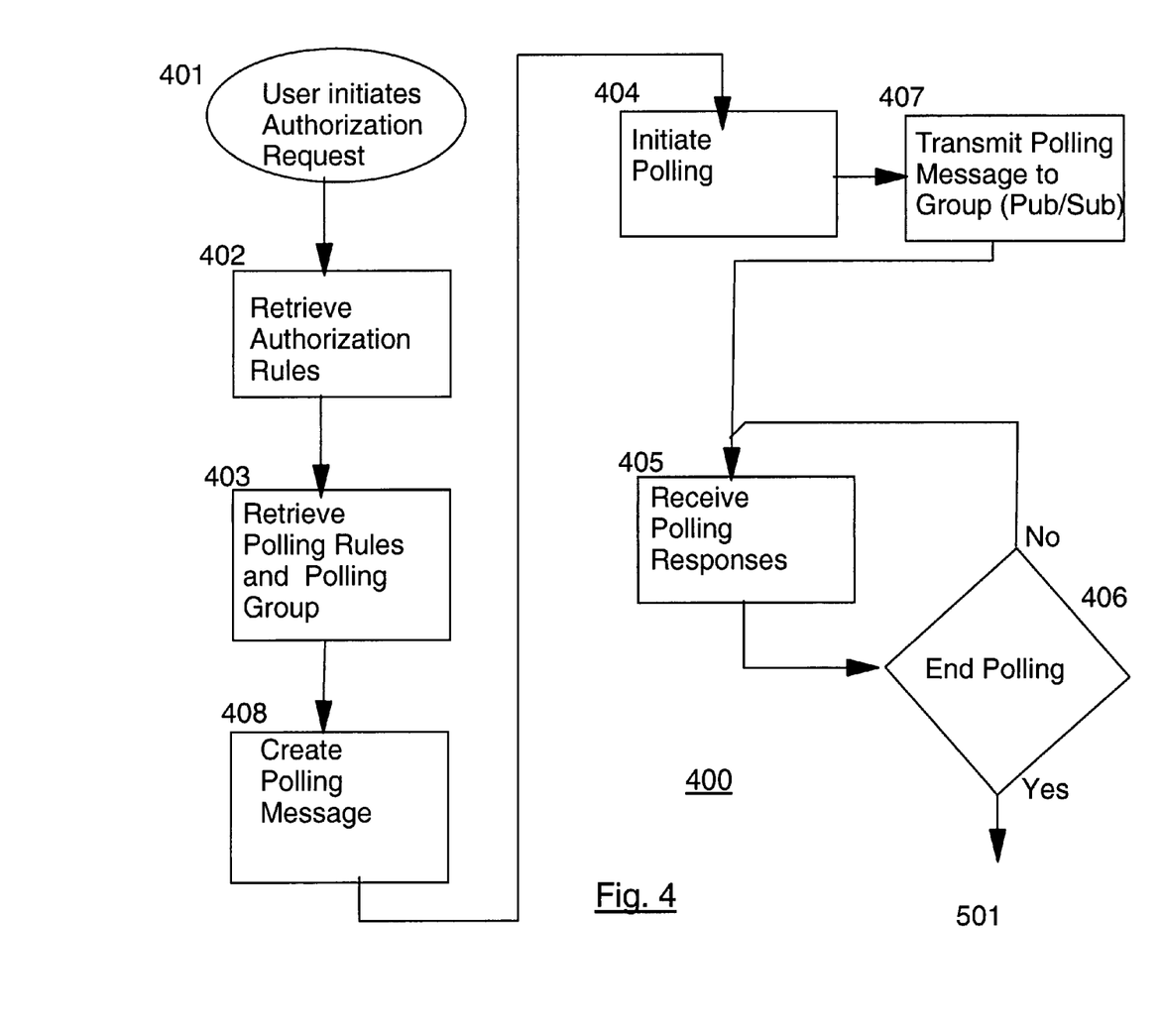
FIG. 4 is a flow diagram of the present invention.
Figure 5:
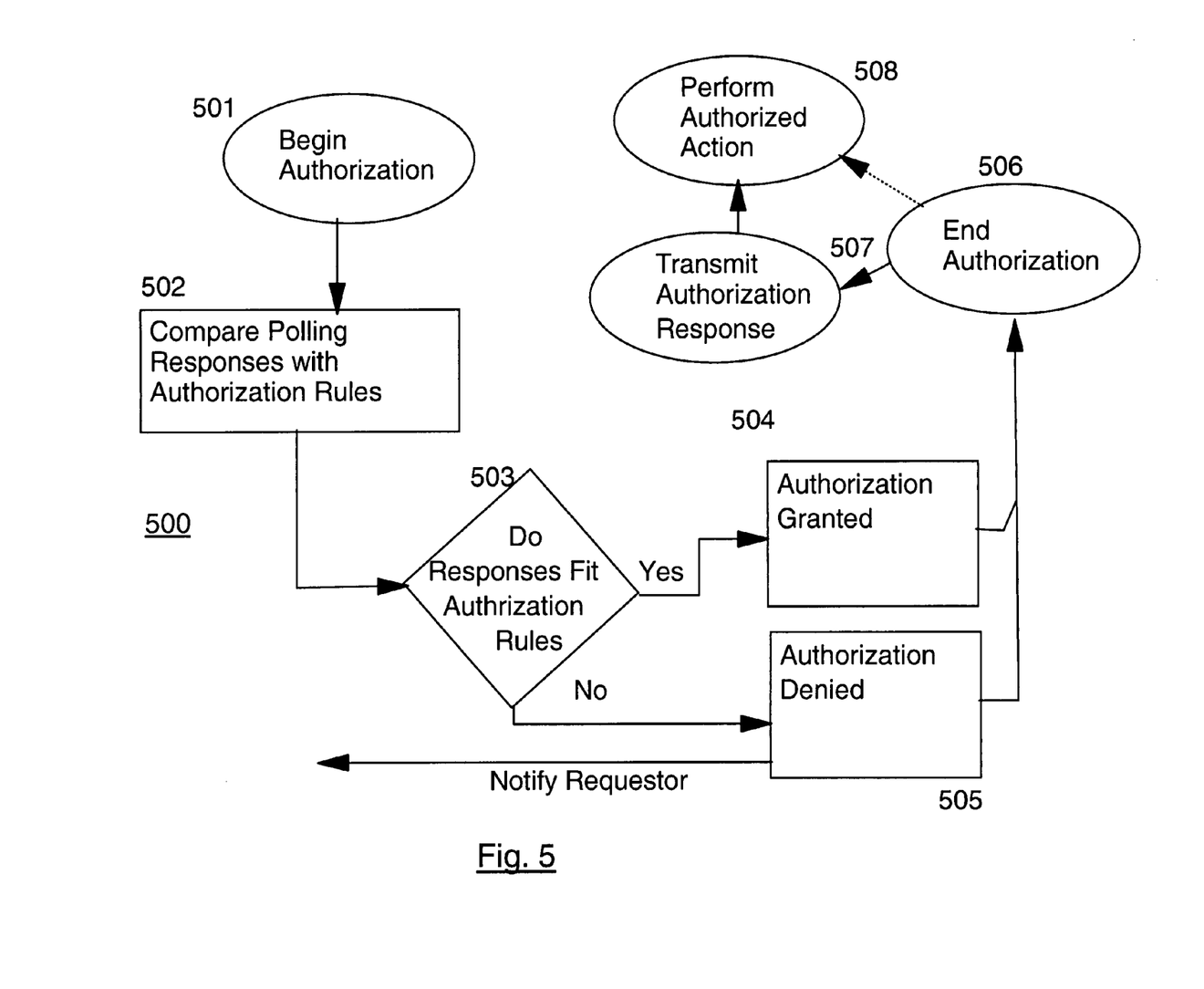
FIG. 5 is a flow diagram demonstrating authorizing steps.

Referring to FIG. 4, in one embodiment, a subscriber to a network community initiates a request 401 for a requested action such as authorization to join a restricted community of subscribers subscribing to a restricted channel, the channel providing chat room instant message communication for authorized subscribers. The request includes identifying information about the subscriber. The request being received by a software agent running on a server. The agent retrieves 402 a set of authorization rules for authorizing subscription to the channel. The rules may include the list of subscribers to be polled, subscriber domains, password or the like. The agent retrieves 403 polling rules (RuleSet) and creates a polling message 408 comprising the authorization request. The agent initiates polling 404 by publishing 407 the authorization request to all subscribers to the community, preferably through a third-party publish-subscribe service that initiates a poll for votes. For example, an instant message is published to subscribers. The agent receives 405 response messages (votes) from subscribers responding to the poll. Once the voting process ends 406 the resulting votes are compared with the voting rules to determine if the requested action is approved (authorization is granted). The end of the voting process is determined by the nature of delivery of the voting process and the rule set used. In one embodiment, the end of the voting process is a defined by a time period expiring. For instance, the system may wait for 15 minutes to accumulate responses to the poll for votes. Referring to FIG. 5, the authorization period begins 501 and results are compared 502 against rule sets defined for the individual vote. In one embodiment, the rule sets have defined a required percentage of responding approving votes and a minimum number of response votes. If the results fit 504 the rule set, then the authorization request is granted. If the results do not fit 505 within the rule set, then the authorization request is denied. At the end of the authorization 506, a response is transmitted 507 to a software agent 508 that performs the requested action (of adding the subscriber to the community). Optionally, the authorizing software agent performs the requested action.

In a preferred embodiment, the request is sent to a web service that performs the authorization including the polling and returns an authorized message if authorized or denial message. In another embodiment a web service performs the requested action when the poll authorizes it.

A preferred embodiment of this system comprises the following components:

A publish/subscribe (pub/sub) system (example: WEBSPHERE Business Integration Message Broker from IBM Corp.) would handle the real-time distribution of messages to the voting members subscribed to the system.

A client software application (example: IBM Community Tools (ICT) from IBM Corp.) receives the published messages and allows the voting members to respond to the voting request. Responses are directed back through the pub/sub system, or alternatively, through a web service to record the votes.

A centralized automation server is preferably required to accept the requests, maintain the rule sets for each type of request, generate the unique poll, initiate the publication to the group, gather the responses from the group within the specified voting period, and process the final outcome (i.e. take predetermined action if the vote passes).

This is accomplished through a combination of a Web Server (Apache), Web Application Server (WEBSPHERE Application Server) IBM Corp., and possibly the use of a backend RDBMS (DB/2 from IBM Corp.), and custom HTML, JSP or Java code (from SUN MICROSYSTEMS) to be installed in the Web Application Server to handle the workflow and provide any web services needed.

Usage Scenarios:
    General RuleSet Criteria minimum responders available
minimum response (% and/or total)
timeout period
weighted vote information per responder (if necessary) or vetoable (+ or −) power per responder
voting success criteria (generally a percent)

Example Scenario: Anonymous Self Moderated Authorization

In ICT, a user wants to create a new community. The user uses a group management plugin and initiates a creation request for a new community. This request is handed to the vote-processing system.

The system creates a new voting instance with the following rule set:
non-weighted (all users equals voting)
minimum percentage online responders 5%
minimum count (100 responses required)
simple majority (50.1% or greater)
timeout is set to 5 minutes From this, a poll is published to the entire subscriber group subscribing to the community, giving each subscriber a chance to anonymously respond. The results are continually tabulated by the system. Once the timeout occurs, the current tabulation is compared against the ruleset. In an example instance the response is:
Response: 3000 people online, 240 respond, 110 vote 'yes'
Result: 8% response rate, >100 responses, % 45.8 yes vote: FAILS on simple majority test In another example:
Response: 200 people online, 105 response, 60 vote 'yes'
Result: 52.5% response rate, >100 responses, % 57.1 yes vote: PASSES Preferably, if the result PASSES, then the automated system performs the request on behalf of the original requester without any further human intervention. If the result FAILS, then the system notifies the original requester with the failure results. A key component of the system is the use of the publish/subscribe system to broadcast the vote and gather the results in real-time, and then to take final action on behalf of the user once the 'real-time' limit has expired.

Scenario: Weighted Authorization

In a preferred Weighted Authorization scenario, a select number of users are authorized as 'leads', and therefore their vote is 'weighted' to be valued at 10 times a normal vote. A normal subscriber user initiates a creation request to create a new community.

The system creates a new voting instance with the following rule set:
weighted ('lead' weight—10; 'normal' weight—1)
minimum percentage online responders 20%
minimum count (100 responses required)
minimum 'lead' count (1 'lead' responses required)
simple majority (50.1% or greater)
timeout is set to 10 minutes After the 10 minutes has elapsed, the voting ends and the results are:
Response: 3000 people online, 1000 respond, 482 people vote 'yes', 2 lead people vote 'yes'.
Result: 33% response rate, >100 responses, % 48.4 yes votes, however, weighted vote count results in an effective 50.2% yes vote:—PASSES Scenario: Weighted Authorization with Veto Administrators This scenario is the same as last scenario, with an additional role of an Administrator 'admin':
weighted ('lead' weight—10, 'admin'—veto power)
minimum 'admin' count (0 responses required)

After the 10 minutes has elapsed, the voting ends and the results are:
Response: 3000 people online, 1000 respond, 482 vote 'yes', 2 leads respond yes, 1 admin responds 'no'
vote—FAILS Although this would normally have passed, in this case, the vote fails, since the admin has veto rights.

ICT Community Creation Example:

IBM Community Tools (ICT) from IBM Corp. features a set of message broadcast applications that use a common publish/subscribe (pub/sub) infrastructure to publish messages to a large set of users, based on "communities" of interest. These communities have "community names" that identify topics of interest, and users may elect to subscribe to various communities to receive broadcasts from other users in that community. A GUI screen is presented to subscribers identifying available communities to which the subscriber may request membership. In an example, one community is titled "Java Programming".

Preferably, the "Java Programming" community would broadcast and receive messages pertaining to any aspect of developing or supporting software written in the Java language. Similarly, a "Project Management" community would serve as a common collaboration channel for project managers (PMs) across the company who may be working on very different product or customer solutions, but share a similar experience in applying common processes to managing those projects. One special case community called "Everyone" exists, of which ALL online users of ICT are active participating members.

To provide the most flexibility, at the least cost, in allowing employees throughout the company to create new communities of interest for collaboration using the ICT tools, an implementation is desired that is easy to use, responsive, and is autonomic or self-moderating by design. While it is desirable to make it quick and easy for an employee to create a new community for "Java Programming", which nearly everyone would likely agree is a reasonable and valuable channel for IBM business collaboration, it is important to ensure that purely frivolous or inappropriate communities, such as "Ugly Coworkers" would not pass through the creation process. Furthermore, it is desirable to avoid the need for a central administrator, who would have to act as the "Communities Czar", approving or disapproving each request. A democratic style voting process is preferred, with a well defined rule set that allows the ICT applications to rely on the best judgments of the general user base to automatically control the community creation process.

To automate this voting process, a community creation feature is added to the ICT client, enabling any online user to submit a proposed new community name and description for immediate approval. After proper checks are made for duplicate names and any special formatting requirements (e.g. minimum length of a description field), the ICT Pollcast application is invoked to broadcast a real-time poll to all online subscribers to the "Everyone" community. One implementation of this process comprises a default rule set which states:

The poll is valid for a maximum of 10 minutes, a minimum of 200 online users of ICT must respond to the poll within that time period, and at least ⅔ of the responders agree that the community warrants creation. If all three criteria are met, an authorized agent process immediately adds the community name to the list of valid public communities for general use.

Another embodiment of this voting process adds an additional rule to also publish a Pollcast to the "$SYS-managers" community, which is an automated group comprising IBM managers ONLY. In addition to requiring the ⅔ majority of the general user approval, a rule is optionally added to indicate that if at least 10% of the responding managers vote that the community does NOT qualify (i.e. less than 90% approval) as a generally useful business asset for ICT collaboration, then the community name is rejected.

In an option of the embodiment, a Pollcast is also sent to the Human Resource "HR" community, and 100% approval is required. Furthermore, at least one response from the Human Resources community is required.

Preemptive Problem Determination Example:

The present invention may be used by robot users known as "agents". The agents are software programs that perform the functions of human users. For example, a server may employ a first agent that subscribes to a community and initiates a request for authority to perform an action. The request is transformed into a poll of other agents subscribing to the community where the other agents represent server availability monitors monitoring the associated server's availability for example. Each of the other agents that is capable of replying to the poll, will vote on accepting new workload parameters and the result is tabulated by a community agent that then grants the request of the first agent according to the ruleset of the community.

In a preferred embodiment (FIG. 6), a group of related servers 609 provide autonomous problem solving before alerting a system administrator.

Figure 6:
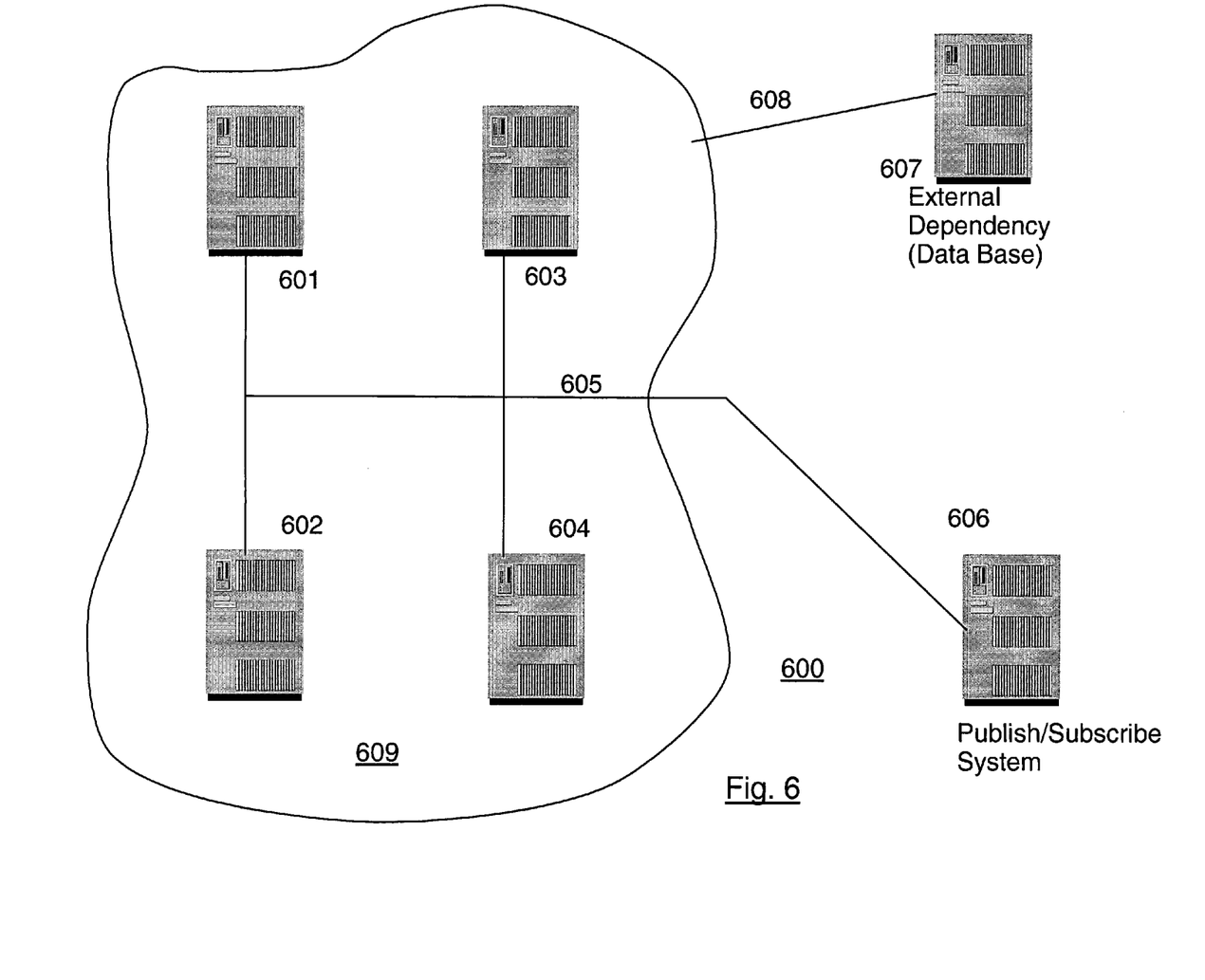
FIG. 6 is a diagram of an example cluster system using the invention.

In an example, a group of servers 601 602 603 604 represents a cluster 609 of Websphere web application servers, all with access to the same resources including a database 607 containing customer information. All of the application servers 609 know how to connect to this database.

In this implementation, the group of servers 609 connect to a publish/subscribe system 606, with additional polling features enabled. Each server 609 has software installed that contains the problem-solving 'decision-making' engine. Preferably, all of the servers in the cluster 609 are always listening to the publish subscribe system 606 for these poll requests.

When a particular server 601 detects that there is a problem connecting to one of its external dependencies (the customer database 607, for example), this server 601 sends out a poll to its immediate neighboring servers 602 603 604 via the publish/subscribe system 606 to determine if any of them can connect to the same database 607. Each server 609 receiving the broadcast will then take appropriate action. In this case, each server would verify its connection to the database 607, and run a simple query against the database tables to ensure proper operation.

Depending on the results, specific actions are taken, for example:

1) If no results are returned, this may indicate a more serious problem—another poll (is ANYONE out there) is sent to the cluster 609 (to help detect more serious network issues), optionally an alert is immediately sent to a system administrator.

2) If results are returned, and a majority of the servers 609 indicate that the database 607 is unavailable, then the problem can be narrowed down to either the database server 609, or the network path 608 to the database server 609 (which can be furthered narrowed down via later polls)

3) If results are returned, but the poll results indicate that only the polling server 601 cannot connect, then the alert can be narrowed down to the polling server 601 (configuration or other problem).

In one embodiment a ruleset for database failure detection comprises:
  non-weighted votes
  90% minimum percentage of online system must respond
  at least 1 responder required
  small percentage (20% or greater)
  timeout is set to 1 minute The rules are quite different in this embodiment, since the server needs much more accurate information in determining whether a database connection has failed.

In an embodiment, the poll is sent out to subscribing server agents for an "is database 607 active" vote. After the 1 minute timeout the following results are tabulated:
  0 responders
  0% reporting failure This indicates a severe failure that requires immediate attention by a systems administrator. No other server agent responded, therefore a more serious problem is occurring. This response is preferably followed up with a secondary poll, or, in another embodiment, this response requires immediate attention by the administrator.

In another embodiment, a poll is sent out for an "is database 607 active" vote. After the 1 minute timeout the following results are tabulated:
  100% of online servers responded
  5 responders
  0% reporting failure If the polling server is detecting a connection problem with database 607, then this is much less severe, indicating a local connection problem. All server agents reported back with no connection problem to the same database 607. In an embodiment, an alert or email is generated and sent to a systems administrator indicating the problem.

In another embodiment, the poll is sent out for an "is database 607 active" action. After the 1 minute timeout the following results are tabulated:
  90% of online servers responded
  9 responders
  25% reporting failure This indicates that there may be an intermittent error with the database itself, since other server agents in the group are experiencing similar connection problems. This would also require quick attention by the system administrators to investigate the error. The fact that 10% of the server agents did not respond is not considered a critical problem as defined by the rule set.

In all the examples, the system administrators are alerted to the fact the there may be a problem with the database 607, but much information has been gathered as to the source of the problem and will shorten the investigation time required.

Preferably, in all these cases, the results from the various servers 609 are tallied and sent to a system administrator for further evaluation, optionally indicating the most likely cause. Narrowing down by using similar machines will help decrease time spent on the problem by an administrator.

This system can easily be extended to support other types of testing and reporting to give as much information as possible to the system administrator for final problem determination.

While the preferred embodiment of the invention has been illustrated and described herein, it is to be understood that the invention is not limited to the precise construction herein disclosed, and the right is reserved to all changes and modifications coming within the scope of the invention as defined in the appended claims.

The invention claimed is:

1. A method for automatically authorizing an action, the method comprising the steps of:
  receiving at an authorizing agent, a request message for authorizing the action, the request received from a remote first subscriber, the first subscriber in network communication with the authorizing software agent, the request comprising a requested action and first subscriber identifying information, the authorizing agent comprising an automated software agent;
  based on the received request message, determining a first group of subscribers to be polled, the first group of subscribers in network communication with the authorizing agent, wherein said subscribers are subscribers to a pub/sub service;
  creating a polling information message, the polling information message comprising attributes of the requested action;
  initiating a polling period by transmitting the polling information message to the first group of subscribers;
  then during the polling period, receiving one or more polling responses from one or more subscribers of the first group of subscribers, the polling responses comprising voting information;
  then determining that the polling period is complete;
  comparing voting information received during the polling period with predetermined authorization rules to determine that authorization is granted; and
  a software agent performing the action when it is determined that authorization is granted.

2. The method according to claim 1 wherein one or more of the subscribers comprises an automated software agent.

3. The method according to claim 1 wherein the performing the action step comprises any one of:
  editing any one of a menu or a GUI;
  performing an action on any one of the menu or the GUI; or
  transmitting a response to the request for authorization, the response indicating any one of authorization is granted if the comparing step determines authorization is granted or authorization is denied if the comparing step determines authorization is not granted.

4. The method according to claim 1 wherein any one of the transmitting polling information or receiving polling responses comprises sending any one of a publish/subscribe message; an instant message; a web page GUI interface or an e-mail.

5. The method according to claim 1 wherein the determining polling is complete comprises any one of the expiration of a predetermined time; responses from a predetermined number of polling responses; responses from a predetermined group of members, receiving a notification to end the polling, a time of day is passed; an authorized subscriber causes polling to complete; a predetermined number of subscriber responses are received or a predetermined group of subscriber responses are received.

6. The method according to claim 1 wherein the first group of subscribers are subscribers to a channel.

7. The method according to claim 1 wherein the polling information message further comprises any one of a requestors identity, instructions on how to vote; links to instructions or information about the requested action.

8. The method according to claim 1 wherein the predetermined authorization rules comprise any one of individual subscriber voting weight; number of subscribers responding; percent of subscribers responding; individual subscriber veto ability; subscriber override ability; subscriber classification or minimum responses required.

9. The method according to claim 1 wherein the requested action comprises any one of granting subscription to a pub/sub channel; creating a new pub/sub channel; initiating a second poll, transmitting an alert message to a subscriber; initiating a series of polls, each poll having a different action or initiating a poll of a second group of subscribers based on the response of the first group of subscribers.

10. The method according to claim 1 wherein the subscribers are software agents monitoring respective server facilities of respective servers, the facilities comprising any one of availability, test query of a specified database, performance, resource availability, historical performance or server group affinity wherein the polling information message comprises elements of the monitored facilities, wherein the action comprises load balancing directives to one or more of the respective servers.

11. The method according to claim 10 wherein the action comprises any one of:
  performing a server recovery operation on any server failing to respond to the poll;
  performing a database recovery action on any database not available at a respective server; or
  creating and transmitting any one of an alert message, server status information or server history information to a systems administrator indicating a problem.

* * * * *